(12) United States Patent  
Jonkers et al.

(10) Patent No.: US 10,705,035 B2  
(45) Date of Patent: Jul. 7, 2020

(54) ANALYSIS OF LAYERED SAMPLES WITH XRF

(71) Applicant: Malvern Panalytical B.V., Almelo (NL)

(72) Inventors: Armand Jonkers, Almelo (NL); Justyna Wiedemair, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 254 days.

(21) Appl. No.: 15/848,342

(22) Filed: Dec. 20, 2017

(65) Prior Publication Data

US 2018/0180562 A1 Jun. 28, 2018

(30) Foreign Application Priority Data

Dec. 22, 2016 (EP) .................................... 16206358

(51) Int. Cl.  
G01N 23/223 (2006.01)

(52) U.S. Cl.  
CPC ..... G01N 23/223 (2013.01); *G01N 2223/076* (2013.01); *G01N 2223/615* (2013.01); *G01N 2223/633* (2013.01)

(58) Field of Classification Search  
CPC ........... G01N 23/223; G01N 2223/076; G01N 2223/303; G01N 2223/615; G01N 2223/633; G01N 23/22; G01N 23/225; G01N 23/2251; G01N 23/2273; G01N 2223/063; G01N 23/20066; G01N 2223/61; G01N 2223/634; G01N 23/2252; G01N 21/9501; G01N 21/9503; G01N 2223/6116; G01N 2223/652; G01N 23/20025;

(Continued)

(56) References Cited

U.S. PATENT DOCUMENTS 3,530,296 A 9/1970 Lehtinen et al.  
6,349,128 B1 * 2/2002 Nelson .................. G01B 15/02 378/44

(Continued)

FOREIGN PATENT DOCUMENTS

JP 56153209 11/1981  
JP 61250509 11/1986

OTHER PUBLICATIONS

Uwe Bergmann et al: "Pseudo-color enhanced x-ray fluorescence imaging of the 9 G01N23/223 Archimedes Palimpsest", SPIE—International Society for Optical Engineering. Proceedings, vol. 7247, Jan. 18, 2009 (Jan. 18, 2009), p. 724702, XP55374542, us ISSN: 0277-786X, DOI: 10.1117/12.806053 ISBN: 978-1-5106-0753-8 the whole document.

(Continued)

*Primary Examiner* — Irakli Kiknadze  
(74) *Attorney, Agent, or Firm* — Leason Ellis LLP (57) ABSTRACT

A method of making X-ray fluorescence, XRF, measurements of a layered sample is described. At least two measurements are made, one through one surface of the sample and another through the opposite surface. This may be conveniently done by inverting the sample between the measurements. The data from the additional measurements may be used to calculate multiple parameters of the sample, such as the concentration, density or thickness of each of the layers.

15 Claims, 8 Drawing Sheets

(58) Field of Classification Search
CPC .. G01N 23/2076; G01B 15/02; G01B 15/025; H01L 22/12; G21K 1/06; G21K 2201/064
USPC ................................. 378/44, 45, 35, 70, 83
See application file for complete search history.

(56) References Cited

U.S. PATENT DOCUMENTS

| | | | | |
|---|---|---|---|---|
| 7,302,034 B2* | 11/2007 | Grodzins | ............. | G01B 15/025 378/50 |
| 8,155,268 B2* | 4/2012 | Pesce | ................... | G01N 23/223 378/45 |
| 8,513,603 B1* | 8/2013 | Lederman | ............ | G01N 23/223 250/305 |
| 9,829,448 B2* | 11/2017 | Wormington | ........ | G01N 23/223 |

OTHER PUBLICATIONS

De Boer D K G et al: "How accurate is the fundamental parameter approach? XRF analysis of bulk and multilayer samples", X-Ray Spectrometry, Heyden & Son Ltd, GB, vol. 22, 1993, pp. 33-38, XP002428174, ISSN: 0049-8246, DOI: 10.1002/XRS.1300220109 the whole document Accepted Mar. 13, 1992.
"Quantitative Analysis", Chapter 5.5 of the Handbook of Practical X-Ray Fluorescence Analysis XRF, by Peter Brouwer (ISBN 90-9016758-7) pp. 369-379.

* cited by examiner

ANALYSIS OF LAYERED SAMPLES WITH XRF

CROSS-REFERENCE TO RELATED PATENT APPLICATIONS

The present application claims priority under 35 U.S.C. § 119 to European Patent Application No. 16206358.0, filed Dec. 22, 2016, which is hereby incorporated by reference in its entirety.

FIELD OF INVENTION

The invention relates to the analysis of layered samples using X-ray fluorescence (XRF).

BACKGROUND TO THE INVENTION

The measurement of samples by X-ray fluorescence (XRF) is a technique well known for industrial analysis. Individual spectral lines correspond to individual elements. A sample can be measured and the strength of the respective XRF spectral line gives a measure of the amount of the corresponding element.

In layered samples analysis can be difficult. This applies in particular in the case that only a limited amount of spectral lines are available for measurement. With layers of finite thickness, X-rays on one layer may pass through another layer and be partially absorbed.

For further details of the methods that can be used to calculate parameters of layered samples from XRF measurements see chapter 5.5 of the Handbook of Practical X-Ray Fluorescence Analysis XRF, by Peter Brouwer (ISBN 90-9016758-7).

In the case that an XRF line comes from an element in a single one of the layers it is possible to measure the intensity and calculate one variable, for example the concentration of the element in that layer or the thickness of the layer, or the thickness of the layer above the layer that contains that element. However, it is not in general possible to tell from which layer a measured signal is coming from in the case that the element may be present in more than one of the layers. Accordingly, in the case that intensity in a given spectral line could come from more than one layer it is not possible to carry out such analysis without more information which may not be available, especially in an industrial setting.

SUMMARY OF THE INVENTION

In accordance with a first aspect of the invention, there is provided a method of making X-ray fluorescence, XRF, measurements of a layered sample comprising a first major surface, a second major surface, and at least two layers between the first and second major surfaces, the method comprising:
  carrying out a first X-ray measurement through the first major surface to obtain a first X-ray intensity value ($I_1$) of a first XRF line corresponding to a first element;
  carrying out a second X-ray measurement through the second major surface to obtain a second X-ray intensity value ($I_2$) of the first XRF line corresponding to the first element; and
  calculating from the first X-ray intensity value ($I_1$) and second X-ray intensity value ($I_2$) at least two analysis parameters selected from the layer parameters, the layer parameters including:
    the concentration ($C_1$) of a first element in the first layer;
    the concentration ($C_2$) of the first element in the second layer;
    the density ($d_1$) of the first layer;
    the density ($d_2$) of the second layer;
    the thickness ($t_1$) of the first layer; and
    the thickness ($t_2$) of the second layer.

By carrying out two measurements, one from each major surface (face) of the layered sample, two measurements are obtained, and hence two parameters of the layered sample may be obtained, for example the thicknesses of each of the first and second layers, in the case that the concentration and density is known, or the concentration of the first element in each of the first and second layers, in the case that the thickness and density is known.

In a preferred arrangement, the second measurement may conveniently be carried out by inverting the sample after the step of carrying out a first X-ray measurement before carrying out the second X-ray measurement. In this way, both measurements can be taken using the same equipment normally used to make a single measurement.

In a preferred embodiment, the calculation uses an iterative process.

For example, in an embodiment, calculating at least two analysis parameters selected from the layer parameters comprises:
  (i) taking assumed or known values for each of the layer parameters apart from a plurality of analysis parameters;
  (ii) assuming the values of the analysis parameters apart from at least one analysis parameter, and calculating an analysed value of the at least one analysis parameter from an X-ray intensity value and the assumed and known values; and
  repeating step (ii) for each of the analysis parameters and X-ray intensity values, replacing the assumed values of the analysis parameters with previously obtained calculated values of the analysis parameters until the calculated values of the analysis parameters converge.

This iterative process can use known techniques for calculating a single parameter, referred to herein as an analysis parameter, from a measurement of a multi-layered structure, and apply it to the calculation of at least two analysis parameters. Conventionally, finding more than one variable value from XRF measurements of a multi-layer film was difficult or even impossible. By simply inverting the sample to take a second measurement, or alternatively measuring the sample in situ from the other side, sufficient data becomes available to simply find two analysis parameters using the iterative process.

The invention is not limited to making only two measurements to obtain two analysis parameters. In embodiments, the first X-ray measurement may include measurement of at least two X-ray intensity values of respective XRF lines, and the second X-ray measurement may likewise include measurement of at least two X-ray intensity values of respective XRF lines, leading to at least four X-ray intensity values. The number of analysis parameters that may be calculated is up to the number of X-ray intensity values measured. For example, when four intensity values are measured, four analysis parameters may be calculated. Of course, it is also possible to calculate three analysis parameters if the others are known. The fourth intensity value may be used as a check.

Calculating at least two analysis parameters selected from the layer parameters may comprise:

(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;

(b) taking assumed or known values for each of the layer parameters apart from the second analysis parameter, including an assumed value of the first analysis parameter, and calculating an analysed value of the second analysis parameter from the second X-ray intensity value ($I_2$) and the assumed and known values;

(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;

(d) replacing the assumed value of the first layer parameter with the analysed value of the first analysis parameter and recalculating an analysed value of the second analysis parameter from the second X-ray intensity value ($I_2$), the assumed and known values, and the analysed value of the first analysis parameter; and repeating steps (c) and (d) until the analysed values of the first analysis parameter and the second analysis parameter converge, and outputting the converged values of the first and second analysis parameters.

Alternatively, calculating at least two parameters selected from the layer parameters may comprise:

(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;

(b) taking known values for each of the layer parameters apart from the analysis parameters, taking the calculated value of the first analysis parameter, and calculating an analysed value of the second analysis parameter from the second X-ray intensity value ($I_2$) and the calculated and known values;

(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;

(d) replacing the assumed value of the first layer parameter with the analysed value of the first analysis parameter and recalculating an analysed value of the second analysis parameter from the second X-ray intensity value ($I_2$), the assumed and known values, and the analysed value of the first analysis parameter; and repeating steps (c) and (d) until the analysed values of the first analysis parameter and the second analysis parameter converge, and outputting the converged values of the first and second analysis parameters.

The sample may additionally include a third layer and the layer parameters additionally comprise:

the concentration ($C_3$) of the first element in the third layer;

the density ($d_3$) of the third layer; and the thickness ($t_3$) of the third layer.

The method may further comprise providing a backing layer of known composition adjacent to the second major surface during the first measurement and/or providing a backing layer of known composition adjacent to the first major surface during the second measurement.

The same backing layer may be used for the first and second measurements. In this case, the step of carrying out a first X-ray measurement through the first major surface obtains a third X-ray intensity value (I3) of a second XRF line corresponding to the second element additionally to the first X-ray intensity value (I1); and the step of carrying out a second X-ray measurement through the second major surface obtains a fourth X-ray intensity value (I4) of the second XRF line corresponding to the second element.

Alternatively, the backing layers for the different measurements may be different. In this case, a first backing layer may have a known composition of a second element different to the first element and a second backing layer may have a known composition of a third element different to the first and second elements. The step of carrying out a first X-ray measurement through the first major surface may use the first backing layer to obtain a third X-ray intensity value ($I_3$) of a second XRF line corresponding to the second element additionally to the first X-ray intensity value ($I_1$) corresponding to the first element; and the step of carrying out a second X-ray measurement through the second major surface may use the second backing layer to obtain a fourth X-ray intensity value ($I_4$) of a fourth XRF line corresponding to the third element additionally to the second X-ray intensity value ($I_2$) corresponding to the first element.

There may be provided a computer program product, arranged to carry out an analysis of X-ray fluorescence measurements on a layered sample comprising a first major surface, a second major surface, and at least two layers between the first and second major surfaces, the measurements including a first X-ray measurement through the first major surface to obtain a first X-ray intensity value ($I_1$) of a first XRF line corresponding to a first element and a second X-ray measurement through the second major surface to obtain a second X-ray intensity value ($I_2$) of the first XRF line corresponding to the first element, wherein the sample is characterised by layer parameters including: the concentration ($C_1$) of the first element in the first layer; the concentration ($C_2$) of the first element in the second layer; the density ($d_1$) of the first layer; the density ($d_2$) of the second layer; the thickness ($t_1$) of the first layer; and the thickness ($t_2$) of the second layer;

wherein the computer program product is arranged to carry out the steps, when run on a computer, of (i) taking known values for each of the layer parameters apart from a plurality of analysis parameters;

(ii) assuming the values of the analysis parameters apart from at least one analysis parameter, and calculating an analysed value of the at least one analysis parameter from the first X-ray intensity value ($I_1$) and the assumed and known values; and (iii) assuming the values of the analysis parameters apart from at least one analysis parameter, and calculating an analysed value of the at least one analysis parameter from the second X-ray intensity value ($I_2$) and the assumed and known values;

repeating steps (ii) and (iii) for each of the analysis parameters, and intensity values, replacing the assumed values of the analysis parameters with previously obtained calculated values of the analysis parameters, until the calculated values converge, and outputting the converged calculated values of the analysis parameters.

The computer program product may be arranged to carry out the steps, when run on a computer, of:

(a) taking assumed or known values for each of the layer parameters apart from a first layer parameter, including an assumed value of a second layer parameter, and calculating an analysed value of the first layer parameter from the first X-ray intensity value ($I_1$) and the assumed and known values;

(b) taking assumed or measured values for each of the layer parameters apart from the second layer parameter, including an assumed value of a first layer parameter, and calculating an analysed value of the second layer parameter from the second X-ray intensity value ($I_2$) and the assumed and known values;

(c) replacing the assumed value of the second layer parameter with the analysed value of the second layer parameter and recalculating an analysed value of the first layer parameter from the first X-ray intensity value ($I_1$), the assumed and known values, and the analysed value of the second layer parameter;

(d) replacing the assumed value of the first layer parameter with the analysed value of the first layer parameter and recalculating an analysed value of the second layer parameter from the second X-ray intensity value ($I_2$), the assumed and known values, and the analysed value of the first layer parameter; and repeating steps (c) and (d) until the analysed values of the first layer parameter and the second layer parameter converge, and outputting the converged values of the first and second layer parameters The computer program product may be arranged to carry out the steps, when run on a computer, of:

(a) taking assumed or known values for each of the layer parameters apart from a first layer parameter, including an assumed value of a second layer parameter, and calculating an analysed value of the first layer parameter from the first X-ray intensity value ($I_1$) and the assumed and known values;

(b) taking assumed or known values for each of the layer parameters apart from the second layer parameter, and taking the analysed value of the first layer parameter, and calculating an analysed value of the second layer parameter from the second X-ray intensity value ($I_2$) and the assumed and known values;

(c) replacing the assumed value of the second layer parameter with the analysed value of the second layer parameter and recalculating an analysed value of the first layer parameter from the first X-ray intensity value ($I_1$), the assumed and known values, and the analysed value of the second layer parameter;

(d) replacing the assumed value of the first layer parameter with the analysed value of the first layer parameter and recalculating an analysed value of the second layer parameter from the second X-ray intensity value ($I_2$), the assumed and known values, and the analysed value of the first layer parameter; and repeating steps (c) and (d) until the analysed values of the first layer parameter and the second layer parameter converge, and outputting the converged values of the first and second layer parameters.

BRIEF DESCRIPTION OF THE DRAWINGS

An example of the invention will now be described with reference to the accompanying diagrams, in which.

The Figures are schematic and not to scale.

DETAILED DESCRIPTION

Figure 1:
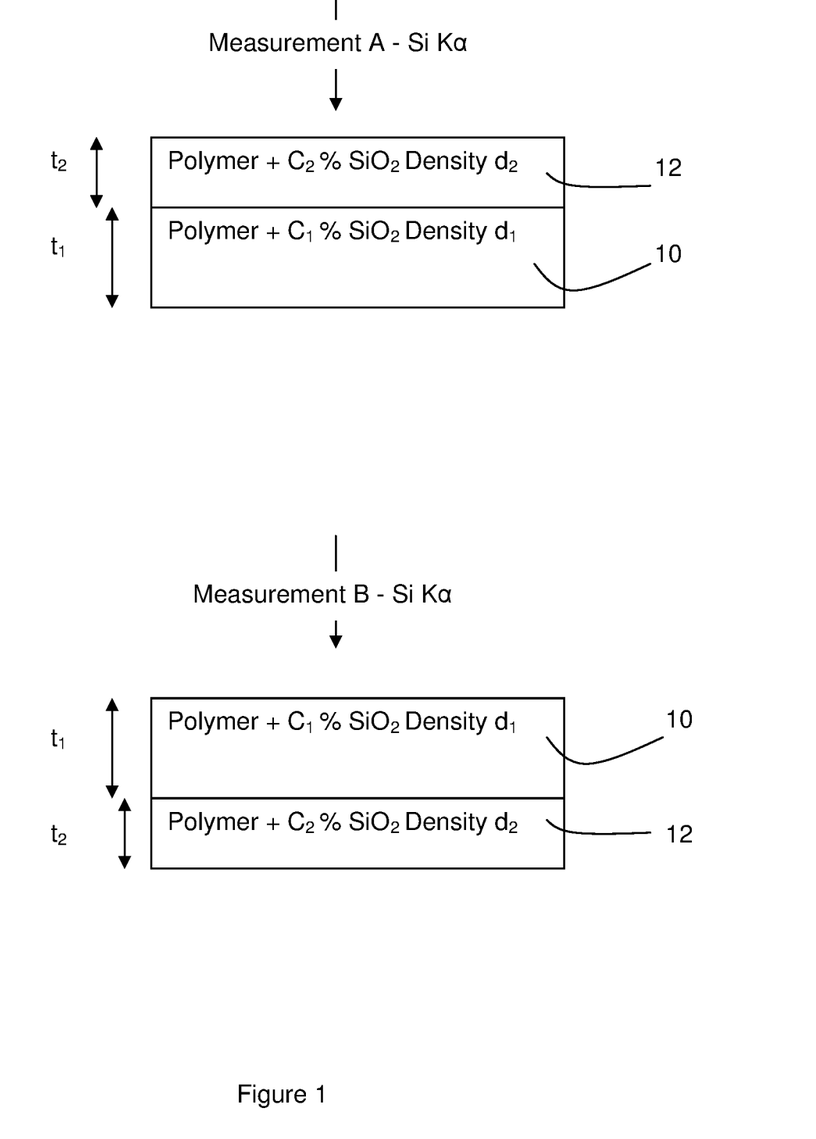
FIG. 1 illustrates measurements on a first sample.

In a first example, consider measurements on a sample as illustrated in FIG. 1. The sample is a two layer sample with a first layer 10 on a second layer 12. The first layer has a thickness $t_1$ and is made up of a polymer with $SiO_2$ present at a concentration $C_1$ (in %) and a density $d_1$. The second layer 12 has a thickness $t_2$ and is made up of a polymer with $SiO_2$ present at a concentration $C_2$ (in %) and a density $d_2$. These concentrations, thicknesses and densities will be referred to as layer parameters, as they are parameters describing the layers.

In this example, the measurement is intended to measure the thicknesses $t_1$ and $t_2$ assuming the other layer parameters are known. These parameters it is intended to measure will be referred to as analysis parameters.

In a first step, a conventional XRF measurement is made (measurement A) from the side of the second layer 12, using the Si Kα spectral line. Then, in a second step, the sample is turned upside down and a second conventional XRF measurement is made (measurement B) from the side of the first layer 10 again using the Si Kα spectral line. Each measurement delivers a respective count rate (intensity).

For further details, see chapter 5.5 of the Handbook of Practical X-Ray Fluorescence Analysis XRF, by Peter Brouwer. This describes the way in which the measurement of one or more XRF lines of a multilayer sample can give rise to one or more parameter values. As described at section 5.5.4, the maximum number of parameters that can be determined from a measurement of XRF lines is one parameter for each measured line. Therefore, for a sample which emits for example two measurement lines corresponding to two elements, two parameters can be measured.

The inventors in the present case have realised that double the number of parameters can be measured from a sample by measuring the sample twice, once from one major surface and once from the other major surface. This allows for the measurement of a number of parameters that was simply not possible before.

Since the calculations presented in chapter 5.5 of the Handbook of Practical X-Ray Fluorescence Analysis XRF are somewhat complicated, in practice it is usual to use commercial analysis software which can analyse the results for a multi-layer sample where there is one variable for each measured X-ray line and all other parameters are known. Such commercial analysis software is available for example under the names Stratos and FP-Multi.

In order to analyse more than one variable, to find a plurality of analysis parameters from the measurements (in the example the thicknesses $t_0$ and $t_1$ of the respective layers), an iterative procedure is used.

Using commercial software, firstly, a material stack is set up in the software for both measurement A and measurement B. In the case of measurement A, the second layer of polymer with $C_2\%$ $SiO_2$ is set up above the first layer with $C_1\%$ $SiO_2$. In the case of measurement B, the first layer of polymer with $C_1\%$ $SiO_2$ is set up above the second layer with $C_2\%$ $SiO_2$. These layer values $C_1$ and $C_2$ are known in advance—they may be measured separately or simply be constants and assumed—and hence will be referred to as known values.

To start the procedure, a thickness $t_{1,assumed}$ is assumed for the first layer and the software used to derive the thickness of the second layer $t_{2,analysed}$ from the measured count of measurement A. In parallel, a thickness $t_{2,assumed}$ is assumed for the second layer and the software used to derive the thickness of the first layer $t_{1,analysed}$ from the count of measurement B.

These analysed values $t_{1,analysed}$ and $t_{2,analysed}$ are in turn is then used as inputs instead of the assumed values for both measurement A and B and the same count rates are used to recalculate the thickness $t_{1,analysed}$ and $t_{2,analysed}$.

The procedure is repeated until the iterative process converges.

An example was carried out using this iterative process leading to the following results:

| Iteration # | Thickness (layer 2, μm) | Thickness (layer 1, μm) |
|---|---|---|
| 0 | 13.099 | 0.99 |
| 1 | 13.099 | 1.612 |
| 2 | 13.099 | 1.612 |

As can be seen, in this particular example the process converged very quickly, after one iteration, to obtain calculated values of both the thickness of layer 2 and the thickness of layer 1 (the calculated analysis values).

Note that the measurement is not limited to the element Si nor to the use of the line type Kα used in the example measurements. Instead, different spectral lines and different elements may be measured, depending on the composition of the stack to be measured.

Figure 2:
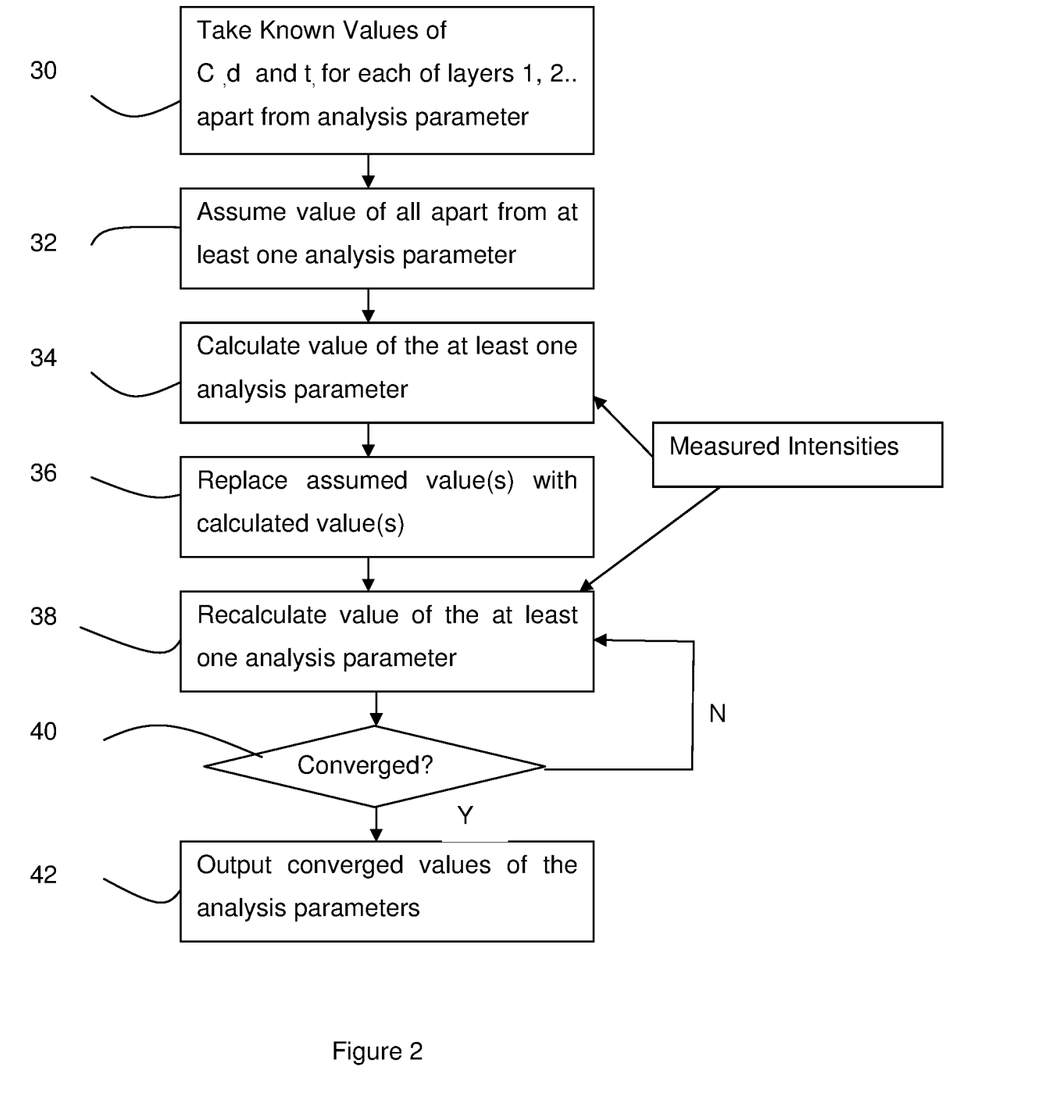
FIG. 2 is a flow diagram of an embodiment of the invention.

In more general terms, a flow chart relating to an embodiment of the process is illustrated in FIG. 2. The method starts with measured intensities as illustrated in the specific example above $I_0$ and $I_1$. If necessary, measurements may be taken with multiple elements as well as multiple X-ray lines.

Then, known values of the layer parameters other than the analysis parameters to be calculated from the measured intensities are taken (step 30).

Next, the value is assumed for at least one of the analysis parameters (step 32) and at least one other analysis parameters calculated (step 34) from one or more measurements. As illustrated below in more detail with respect to FIG. 3, one way of doing this is to calculate each analysis parameter in parallel from a respective measurement with assumed values for each of the other analysis parameters. Alternatively, as illustrated with respect to FIG. 4, only one single analysis parameter can be calculated in this step.

Next, any calculated analysis parameter values are used to replace the respective assumed value (step 36). At least one analysis parameter is recalculated (step 38). If all analysis parameters were calculated in step 34, typically all will be recalculated in step 38 each recalculation using a respective measurement intensity. Alternatively, step 38 can calculate each analysis parameter singly in turn from the measurement intensities again taken singly in turn.

Convergence of the process is then tested for. If the analysis parameters are not converged, steps 36 and 38 are repeated until they are in an iterative fashion.

When the analysis parameters converge, they are output (step 42).

Figure 3:
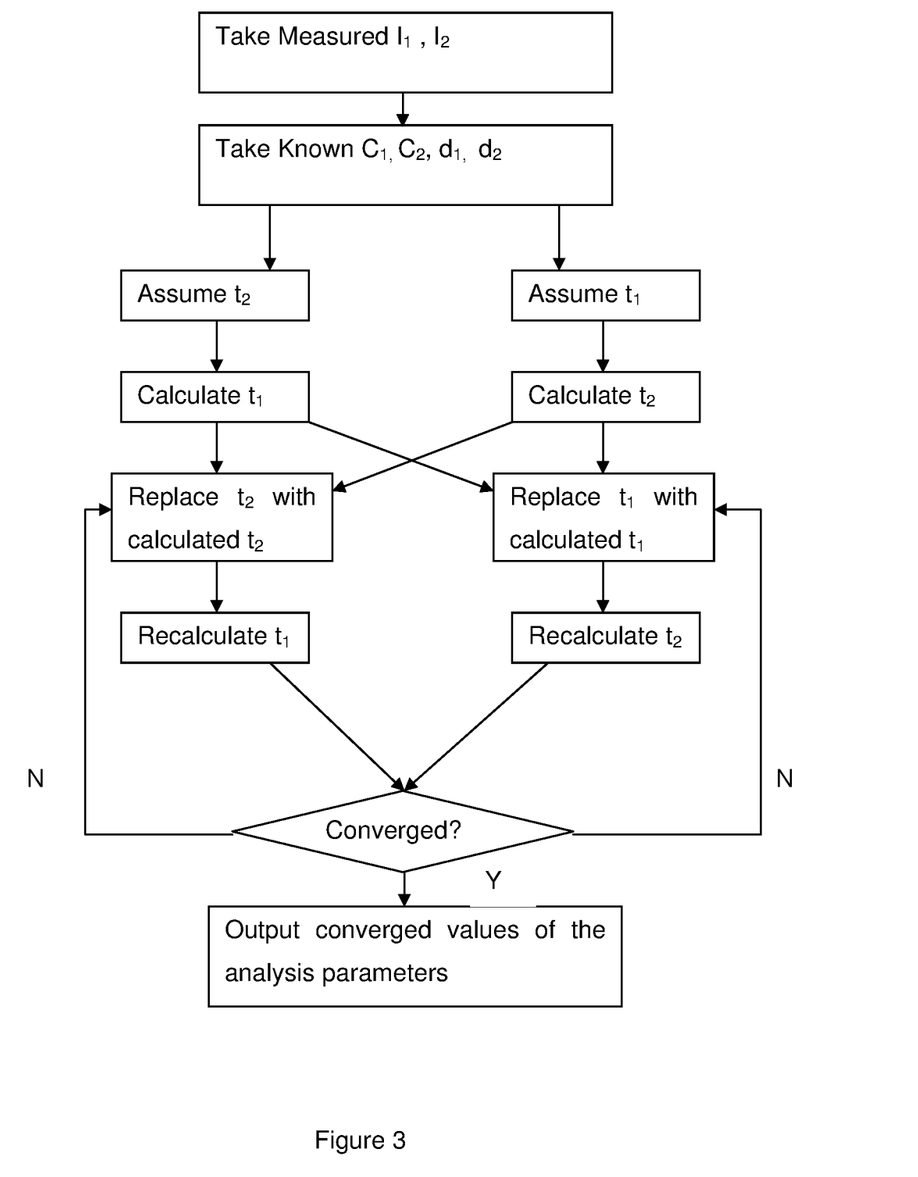
FIG. 3 is a flow diagram of a specific embodiment of the invention.

Referring to FIG. 3, in the specific example discussed above with regard to FIG. 1, the method firstly carries out the calculation of the first analysis parameter from the first intensity value in parallel with the calculation of the second analysis parameter from the second intensity value.

In more detail the sequence of steps may be:
(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;
(b) taking assumed or known values for each of the layer parameters apart from the second analysis parameter, including an assumed value of the first analysis parameter, and calculating an analysed value of the second analysis parameter from the second X-ray intensity value ($I_2$) and the assumed and known values;
(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;
(d) replacing the assumed value of the first layer parameter with the analysed value of the first analysis parameter and recalculating an analysed value of the second analysis parameter from the second X-ray intensity value ($I_2$), the assumed and known values, and the analysed value of the first analysis parameter; and
repeating steps (c) and (d) until the analysed values of the first analysis parameter and the second analysis parameter converge, and outputting the converged values of the first and second analysis parameters.

Figure 4:
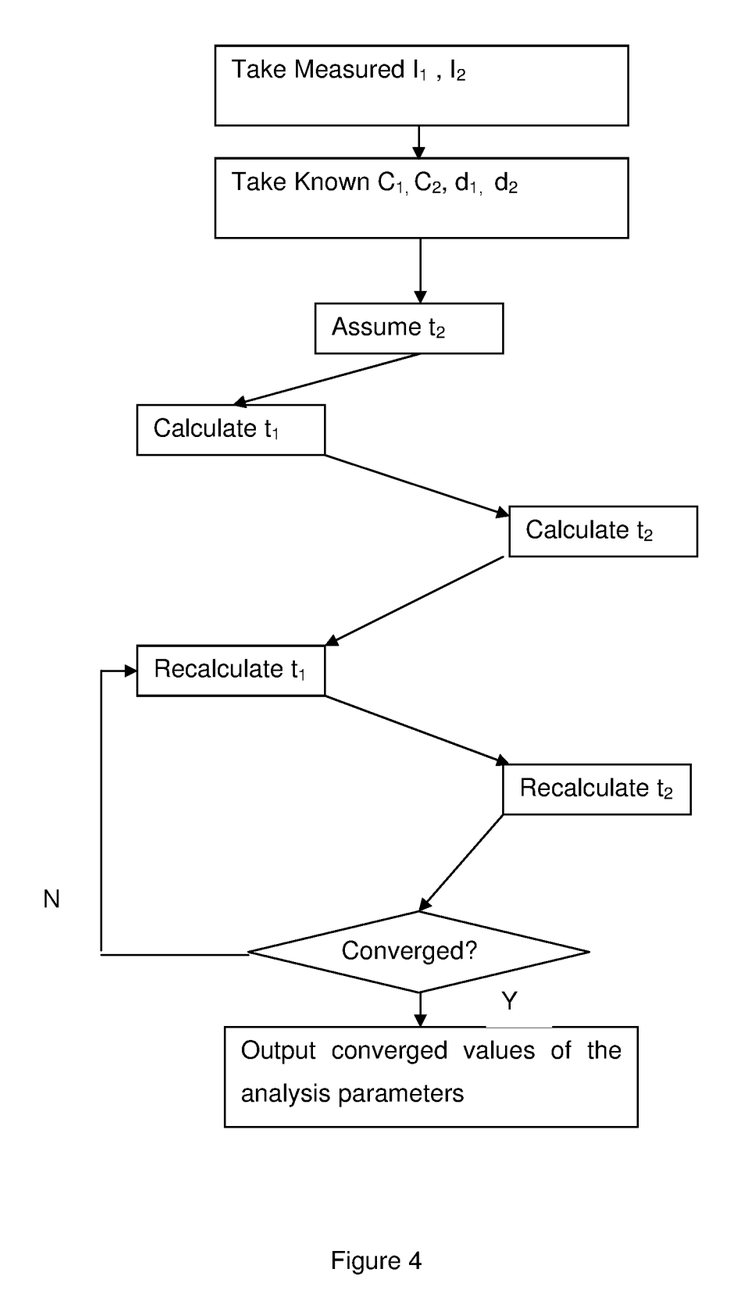
FIG. 4 is a flow diagram of another specific embodiment of the invention.

In an alternative approach, illustrated with reference to FIG. 4, the method firstly carries out the calculation of the first analysis parameter from the first intensity value and then carries out the calculation of the second analysis parameter from the second intensity value using the result of the first calculation instead of from an assumed value as in the method of FIG. 3.

In more detail, the sequence of steps may be:
(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;
(b) taking known values for each of the layer parameters apart from the analysis parameters, taking the calculated value of the first analysis parameter, and calculating an analysed value of the second analysis parameter from the second X-ray intensity value ($I_2$) and the calculated and known values;
(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;

(d) replacing the assumed value of the first analysis parameter with the analysed value of the first analysis parameter and recalculating an analysed value of the second analysis parameter from the second X-ray intensity value ($I_2$), the assumed and known values, and the analysed value of the first analysis parameter; and repeating steps (c) and (d) until the analysed values of the first analysis parameter and the second analysis parameter converge, and outputting the converged values of the first and second analysis parameters.

The method can be applied to more complex scenarios.

Figure 5:
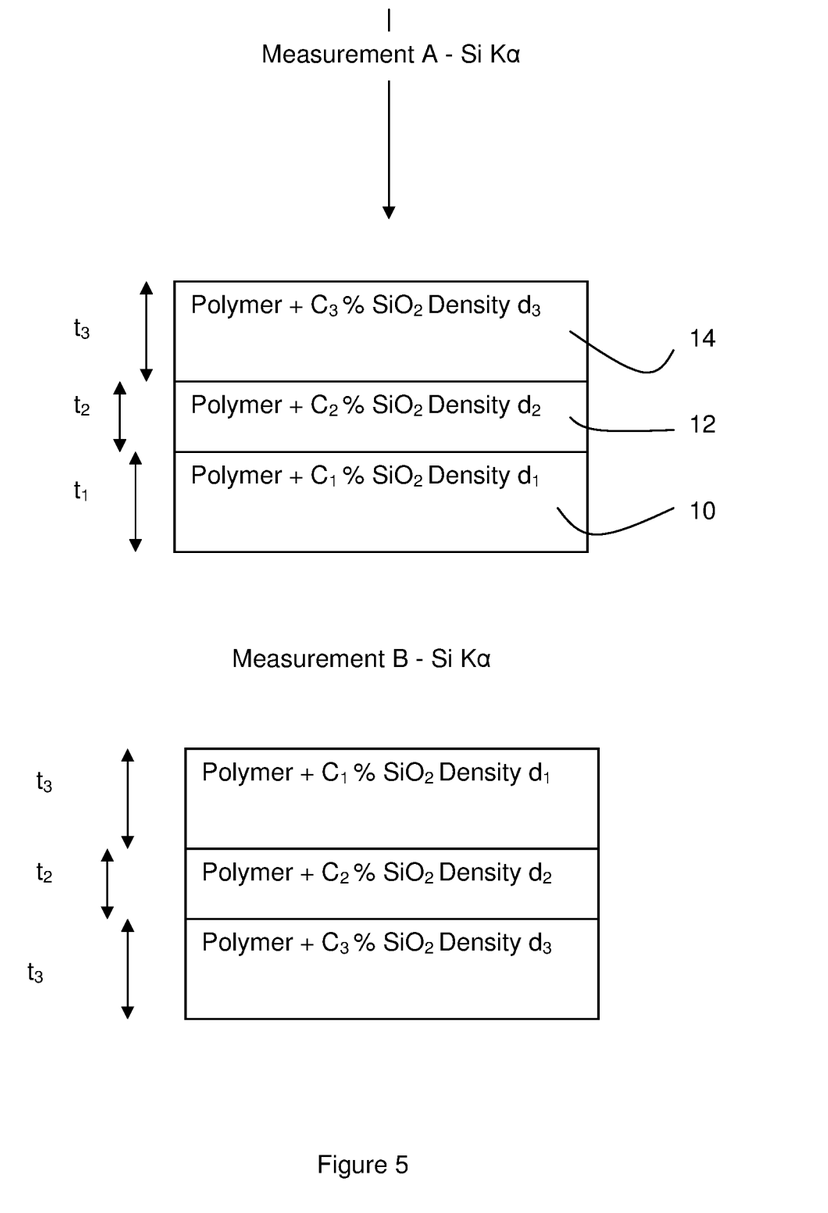
FIG. 5 illustrates measurements on an alternative sample according to a further embodiment of the invention.

Referring to FIG. 5, the method is not limited to only two layers. The method also works for multi-layer samples, such as the three layers illustrated in FIG. 5, the first layer 10, the second layer 12 and the third layer 14. In this case there are nine potential parameters ($C_1, C_2, C_3$, $t_1, t_2, t_3$, $d_1, d_2, d_3$) and the method can be used to calculate any two of them if the others are known.

It will be appreciated in particular that if the thicknesses and densities of the respective elements are known the concentrations of the respective elements can be calculated instead.

The method may work with other types of materials and may in particular be of use on measurements on metal foils, glass, paper, and others.

The method may be used for measurements of a layer of interest including for example additives and coatings as long as they produce X-ray lines that can be measured. The method also works for measurement of elements that absorb lines of other materials.

Figure 6:
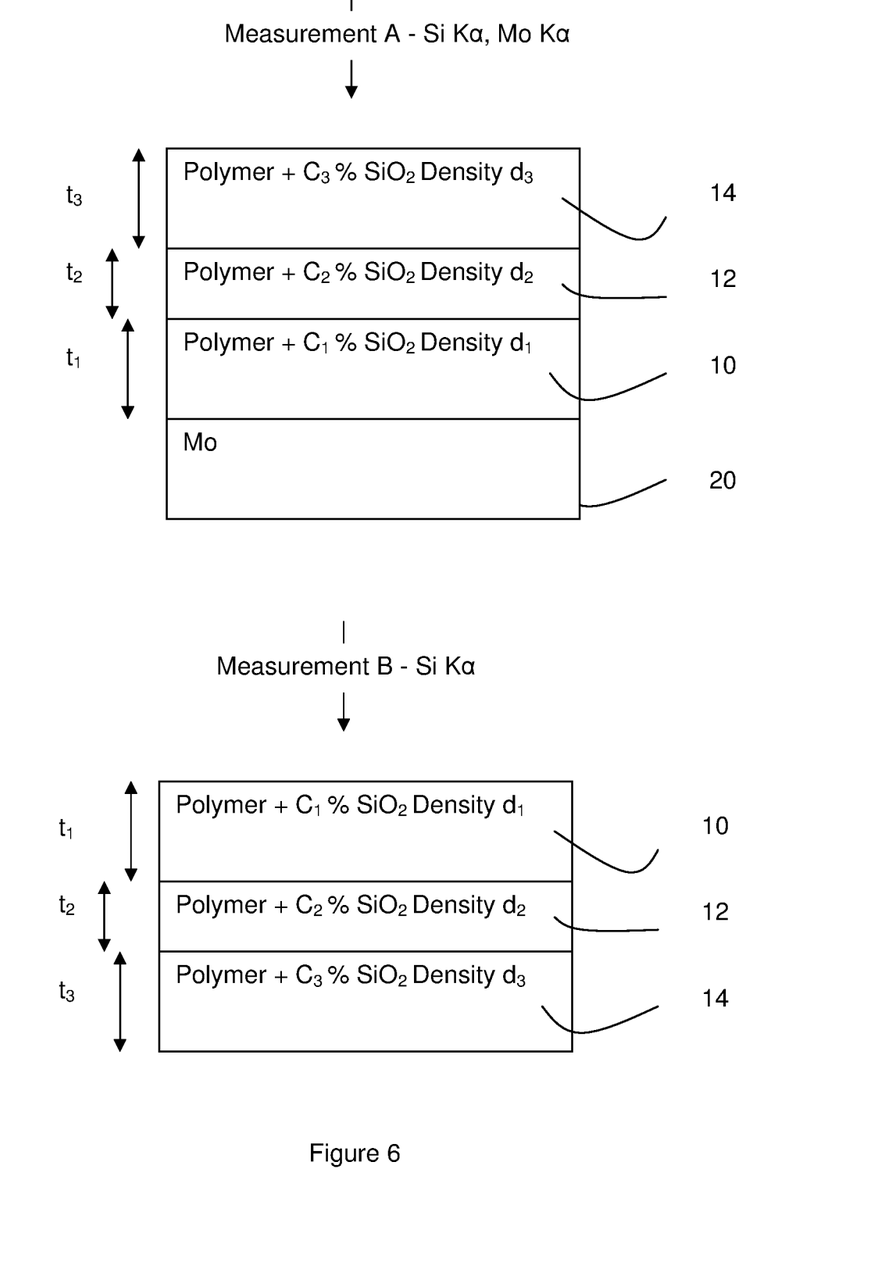
FIG. 6 illustrates measurements using a backing layer according to a further embodiment of the invention.

In the case that more than two variables are required, an extension of the method may be used as illustrated in FIG. 6. In this case, the three layer thicknesses of a three layer structure are to be obtained. The method discussed above with regard to FIG. 5 only produces two pieces of measured data (measurement A and measurement B) and so in principle cannot determine three thicknesses.

The inventors have realised that it is possible to use an additional layer, a backing layer 20, which is a layer containing an additional element, in known composition. The backing layer may if appropriate contain more than one such element, and may include multiple layers of different thicknesses and density.

In the example of FIG. 6, the backing layer is a metal foil of molybdenum (Mo). Measurement A now measures the lines corresponding to both Mo and Si. In this embodiment, measurement B omits the Mo backing layer.

The X-ray line from the additional element, here Mo, is absorbed through the stack of layers which provides extra information to allow for analysis of extra parameters.

Again, iteration is used to calculate the thicknesses in measurement A and B. In the case that more than two variables are to be measured, all but one of the variables are assumed for each iteration and one variable is calculated. The calculated variable is cycled through each of the iterations, one at a time.

In this case, measurement A delivers two intensity values (Si and Mo) and measurement B delivers one intensity value (Si) leading to three measurements which allows for three parameters to be analysed.

Figure 7:
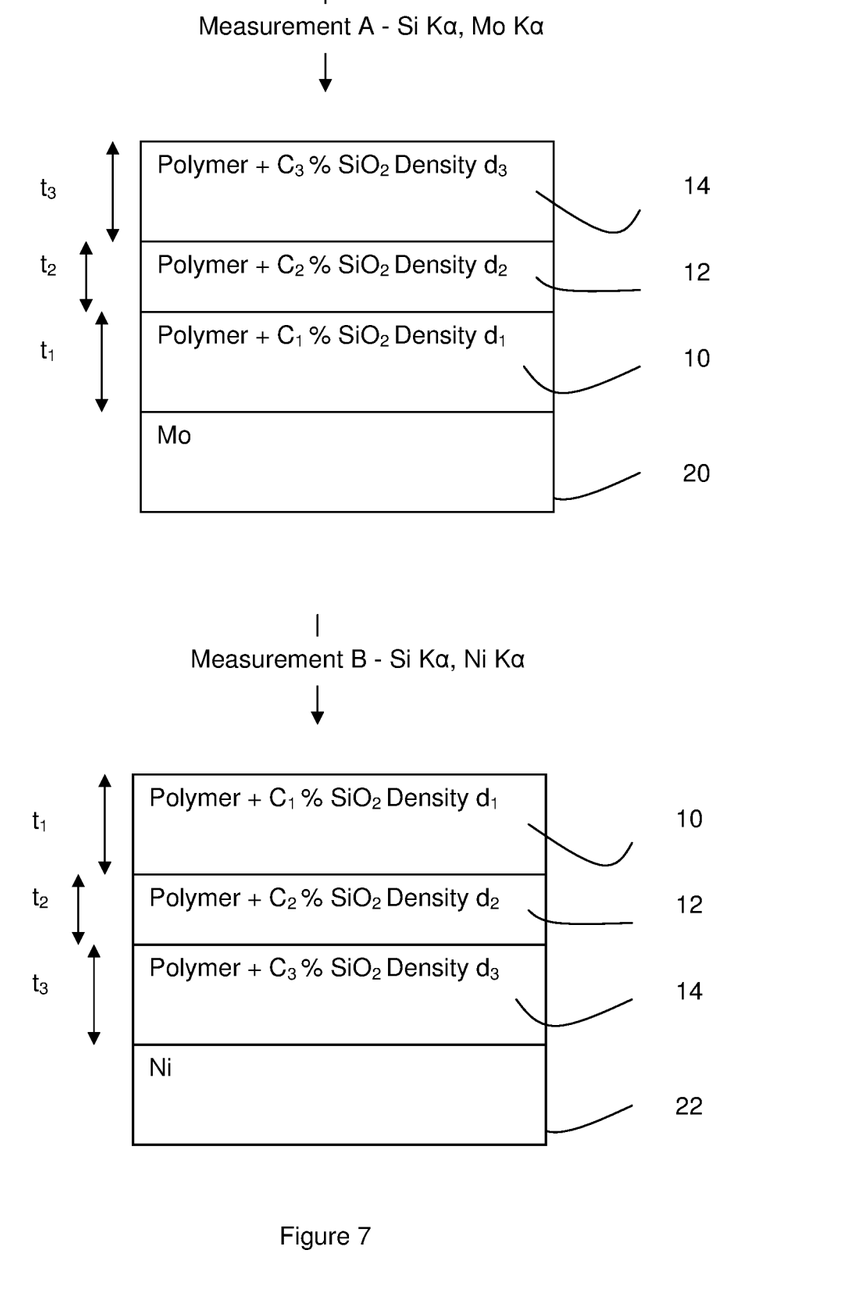
FIG. 7 illustrates measurements using two backing layers according to a yet further embodiment of the invention.

A variation of this approach is illustrated in FIG. 7. In this case, different backing layers 20, 22 are used for Measurements A and B respectively, in each case with a different respective element—for example Mo in backing layer 20 used for measurement A and Ni in backing layer 22 used for measurement B.

Figure 8:
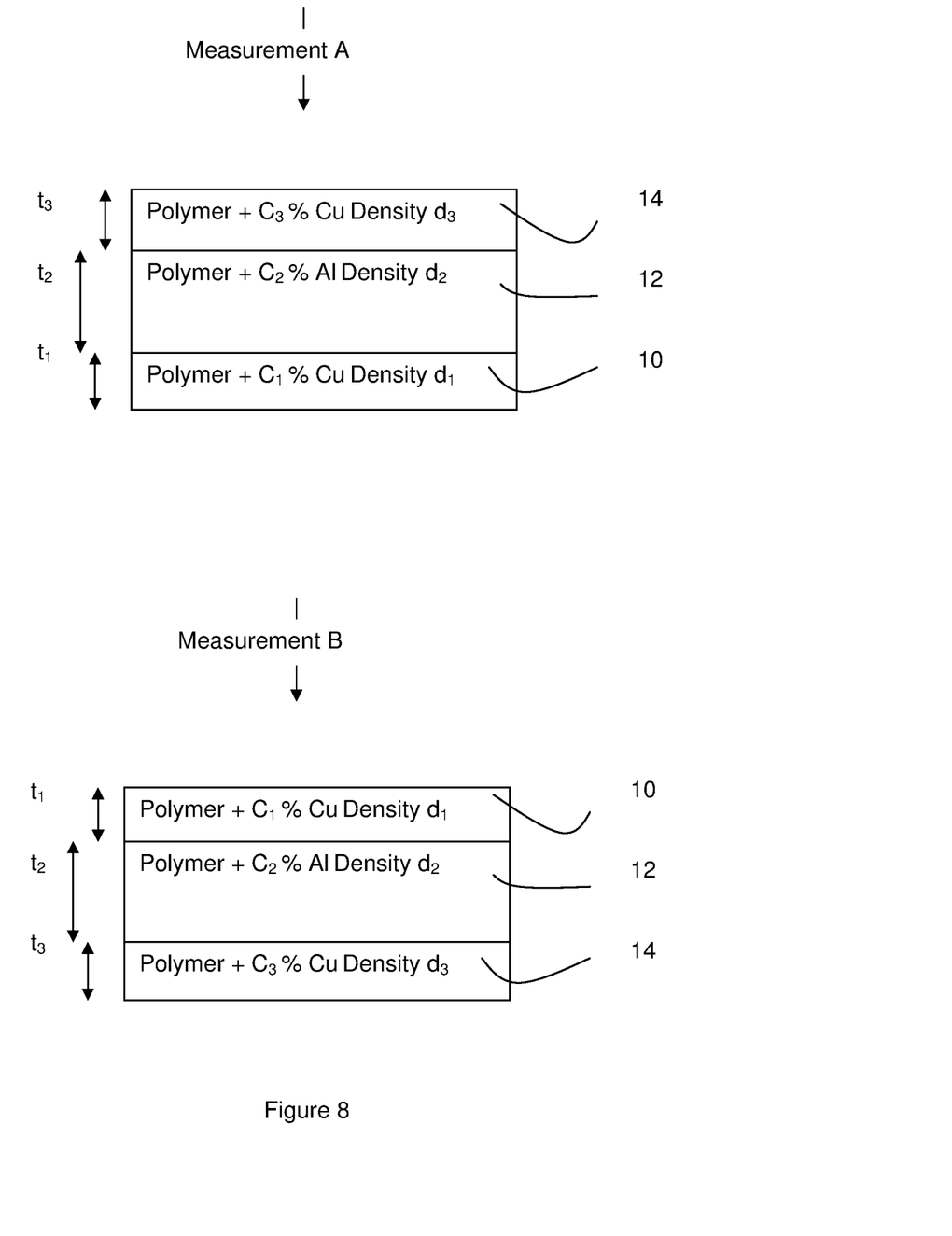
FIG. 8 illustrates measurements on a further sample according to a further embodiment of the invention.

A further variation is illustrated in FIG. 8. In this example, the sample is an Al layer with two polymer layers containing copper, one on either side. Each of measurements A and B includes a measurement both using CuKα and CuLα. In this way, a total of four intensity values relating to the presence of Cu are made. Since four measurements have been made, it is possible to determine four different parameters, and in this way both the thickness and the concentration of both of the Cu containing layers can be measured, assuming the density is known.

Thus, the method is not just limited to obtaining two parameters from two measurements but by measuring additional elements or lines additional parameters may be measured. By inverting the sample (or otherwise measuring from different sides) double the number of measurements can be made than would otherwise be possible.

Additionally, the density and thickness of Al may also be measured using an Al line.

FIG. 8 is of course also an example of a measurement process not involving Si. The method is not limited to Si, Cu, Al and the like and any suitable elements may be measured.

It will be appreciated that this approach delivers still more data by using different lines in the different measurements which in some cases allows the determination of additional variables.

The invention claimed is:

1. A method of making X-ray fluorescence, XRF, measurements of a layered sample comprising a first major surface, a second major surface, and at least two layers between the first and second major surfaces, the method comprising:

carrying out a first X-ray measurement through the first major surface to obtain a first X-ray intensity value ($I_1$) of a first XRF line corresponding to a first element;

carrying out a second X-ray measurement through the second major surface to obtain a second X-ray intensity value ($I_2$) of the first XRF line corresponding to the first element; and calculating from the first X-ray intensity value ($I_1$) and second X-ray intensity value ($I_2$) at least two analysis parameters selected from the layer parameters, the layer parameters including:

the concentration ($C_1$) of a first element in the first layer;

the concentration ($C_2$) of the first element in the second layer;

the density ($d_1$) of the first layer;

the density ($d_2$) of the second layer;

the thickness ($t_1$) of the first layer; and the thickness ($t_2$) of the second layer.

2. The method according to claim 1, wherein the sample is inverted after the step of carrying out the first X-ray measurement before carrying out the second X-ray measurement.

3. The method according to claim 1, wherein calculating at least two analysis parameters selected from the layer parameters is an iterative process comprising:

(i) taking assumed or known values for each of the layer parameters apart from a plurality of analysis parameters;

(ii) assuming the values of the analysis parameters apart from at least one analysis parameter, and calculating an analysed value of the at least one analysis parameter from an X-ray intensity value and the assumed and known values; and repeating step (ii) for each of the analysis parameters and X-ray intensity values, replacing the assumed values of the analysis parameters with previously obtained calculated values of the analysis parameters until the calculated values of the analysis parameters converge.

4. The method according to claim 1, wherein the first X-ray measurement includes measurement of at least two X-ray intensity values of respective XRF lines, and the second X-ray measurement includes measurement of at least two X-ray intensity values of respective XRF lines, leading to at least four X-ray intensity values.

5. The method according to claim 4, including calculating at least three analysis parameters from the at least four X-ray intensity values.

6. The method according to claim 4, including calculating the same number of analysis parameters as measured X-ray intensity values.

7. The method according to claim 1, wherein calculating at least two analysis parameters selected from the layer parameters comprises:
(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;
(b) taking assumed or known values for each of the layer parameters apart from the second analysis parameter, including an assumed value of the first analysis parameter, and calculating an analysed value of the second layer parameter from the second X-ray intensity value ($I_2$) and the assumed and known values;
(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;
(d) replacing the assumed value of the first analysis parameter with the analysed value of the first analysis parameter and recalculating an analysed value of the second analysis parameter from the second X-ray intensity value ($I_2$), the assumed and known values, and the analysed value of the first analysis parameter; and
repeating steps (c) and (d) until the analysed values of the first analysis parameter and the second analysis parameter converge, and outputting the converged values of the first and second analysis parameters.

8. The method according to claim 1, wherein calculating at least two parameters selected from the layer parameters comprises:
(a) taking assumed or known values for each of the layer parameters apart from a first analysis parameter, including an assumed value of a second analysis parameter, and calculating an analysed value of the first analysis parameter from the first X-ray intensity value ($I_1$) and the assumed and known values;
(b) taking known values for each of the layer parameters apart from the analysis parameters, taking the calculated value of the first analysis parameter, and calculating an analysed value of the second analysis parameter from the second X-ray intensity value ($I_2$) and the calculated and known values;
(c) replacing the assumed value of the second analysis parameter with the analysed value of the second analysis parameter and recalculating an analysed value of the first analysis parameter from the first X-ray intensity value ($I_1$), the assumed and known values, and the analysed value of the second analysis parameter;
(d) replacing the assumed value of the first analysis parameter with the analysed value of the first analysis parameter and recalculating an analysed value of the second analysis parameter from the second X-ray intensity value ($I_2$), the assumed and known values, and the analysed value of the first analysis parameter; and
repeating steps (c) and (d) until the analysed values of the first analysis parameter and the second analysis parameter converge, and outputting the converged values of the first and second analysis parameters.

9. The method according to claim 1, wherein the sample additionally includes a third layer and the layer parameters additionally comprise:
the concentration ($C_3$) of the first element in the third layer;
the density ($d_3$) of the third layer; and
the thickness ($t_3$) of the third layer.

10. The method according to claim 1, further comprising providing a backing layer of known composition adjacent to the second major surface during the first measurement and/or providing a backing layer of known composition adjacent to the first major surface during the second measurement.

11. The method according to claim 10 wherein
the backing layer has a known composition of a second element different to the first element and the same backing layer is used for the first and second measurements;
the step of carrying out a first X-ray measurement through the first major surface obtains a third X-ray intensity value ($I_3$) of a second XRF line corresponding to the second element additionally to the first X-ray intensity value ($I_1$); and
the step of carrying out a second X-ray measurement through the second major surface obtains a fourth X-ray intensity value ($I_4$) of the second XRF line corresponding to the second element additionally to the second X-ray intensity value ($I_2$).

12. The method according to claim 10 wherein
the backing layers comprise a first backing layer of known composition of a second element different to the first element and a second backing layer of known composition of a third element different to the first and second elements;
the step of carrying out a first X-ray measurement through the first major surface uses the first backing layer to obtain a third X-ray intensity value ($I_3$) of a second XRF line corresponding to the second element additionally to the first X-ray intensity value ($I_1$) corresponding to the first element; and
the step of carrying out a second X-ray measurement through the second major surface uses the second backing layer to obtain a fourth X-ray intensity value ($I_4$) of a fourth XRF line corresponding to the third element additionally to the second X-ray intensity value ($I_2$) corresponding to the first element.

13. A computer program product comprising a tangible non-transitory computer readable medium in which program instructions are stored, arranged to carry out an analysis of X-ray fluorescence measurements on a layered sample comprising a first major surface, a second major surface, and at least two layers between the first and second major surfaces, the measurements including a first X-ray measurement through the first major surface to obtain a first X-ray intensity value ($I_1$) of a first XRF line corresponding to a first element and a second X-ray measurement through the second major surface to obtain a second X-ray intensity value ($I_2$) of the first XRF line corresponding to the first element, wherein the sample is characterised by layer parameters including: the concentration ($C_1$) of the first element in the first layer; the concentration ($C_2$) of the first element in the second layer; the density ($d_1$) of the first layer; the density ($d_2$) of the second layer; the thickness ($t_1$) of the first layer; and the thickness ($t_2$) of the second layer;

wherein the computer program product is arranged to carry out the steps, when run on a computer, of (i) taking known values for each of the layer parameters apart from a plurality of analysis parameters;

(ii) assuming the values of the analysis parameters apart from at least one analysis parameter, and calculating an analysed value of the at least one analysis parameter from the first X-ray intensity value ($I_1$) and the assumed and known values; and (iii) assuming the values of the analysis parameters apart from at least one analysis parameter, and calculating an analysed value of the at least one analysis parameter from the second X-ray intensity value ($I_2$) and the assumed and known values;

repeating steps (ii) and (iii) for each of the analysis parameters, and intensity values, replacing the assumed values of the analysis parameters with previously obtained calculated values of the analysis parameters, until the calculated values converge, and outputting the converged calculated values of the analysis parameters.

14. The computer program product according to claim 13 wherein the computer program product is arranged to carry out the steps, when run on a computer, of:

(a) taking assumed or known values for each of the layer parameters apart from a first layer parameter, including an assumed value of a second layer parameter, and calculating an analysed value of the first layer parameter from the first X-ray intensity value ($I_1$) and the assumed and known values;

(b) taking assumed or measured values for each of the layer parameters apart from the second analysis parameter, including an assumed value of a first layer parameter, and calculating an analysed value of the second layer parameter from the second X-ray intensity value ($I_2$) and the assumed and known values;

(c) replacing the assumed value of the second layer parameter with the analysed value of the second layer parameter and recalculating an analysed value of the first layer parameter from the first X-ray intensity value ($I_1$), the assumed and known values, and the analysed value of the second layer parameter;

(d) replacing the assumed value of the first layer parameter with the analysed value of the first layer parameter and recalculating an analysed value of the second layer parameter from the second X-ray intensity value ($I_2$), the assumed and known values, and the analysed value of the first layer parameter; and repeating steps (c) and (d) until the analysed values of the first layer parameter and the second layer parameter converge, and outputting the converged values of the first and second layer parameters.

15. The computer program product according to claim 13 wherein the computer program product is arranged to carry out the steps, when run on a computer, of:

(a) taking assumed or known values for each of the layer parameters apart from a first layer parameter, including an assumed value of a second layer parameter, and calculating an analysed value of the first layer parameter from the first X-ray intensity value ($I_1$) and the assumed and known values;

(b) taking assumed or known values for each of the layer parameters apart from the second layer parameter, and taking the analysed value of the first layer parameter, and calculating an analysed value of the second layer parameter from the second X-ray intensity value ($I_2$) and the assumed and known values;

(c) replacing the assumed value of the second layer parameter with the analysed value of the second layer parameter and recalculating an analysed value of the first layer parameter from the first X-ray intensity value ($I_1$), the assumed and known values, and the analysed value of the second layer parameter;

(d) replacing the assumed value of the first layer parameter with the analysed value of the first layer parameter and recalculating an analysed value of the second layer parameter from the second X-ray intensity value ($I_2$), the assumed and known values, and the analysed value of the first layer parameter; and repeating steps (c) and (d) until the analysed values of the first layer parameter and the second layer parameter converge, and outputting the converged values of the first and second layer parameters.

* * * * *